(12) United States Patent
Blagodurov et al.

(10) Patent No.: US 11,934,331 B2
(45) Date of Patent: Mar. 19, 2024

(54) COMMUNICATION ENGINE FOR HYBRID INTERCONNECT TECHNOLOGIES

(71) Applicant: Advanced Micro Devices, Inc., Santa Clara, CA (US)

(72) Inventors: Sergey Blagodurov, Bellevue, WA (US); Antonio Maria Franques Garcia, Urbana, IL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/588,612

(22) Filed: Sep. 30, 2019

(65) Prior Publication Data

US 2021/0097014 A1   Apr. 1, 2021

(51) Int. Cl.
| | |
|---|---|
| H04W 72/00 | (2023.01) |
| G06F 13/40 | (2006.01) |
| H04L 12/46 | (2006.01) |
| H04L 45/02 | (2022.01) |
| H04L 47/28 | (2022.01) |
| H04W 28/02 | (2009.01) |

(Continued)

(52) U.S. Cl.
CPC .......... *G06F 13/4027* (2013.01); *H04L 12/46* (2013.01); *H04L 45/02* (2013.01); *H04L 47/28* (2013.01); *H04W 28/0221* (2013.01); *H04W 40/10* (2013.01); *H04W 72/30* (2023.01)

(58) Field of Classification Search
None
See application file for complete search history.

(56) References Cited

U.S. PATENT DOCUMENTS

| | | | |
|---|---|---|---|
| 7,634,273 B2 | 12/2009 | Kim et al. | |
| 2007/0201540 A1* | 8/2007 | Berkman | H04B 3/542 |
| | | | 375/219 |

(Continued)

OTHER PUBLICATIONS

Agyeman et al., "On the Design of Reliable Hybrid Wired-Wireless Network-on-Chip Architectures", 2015 IEEE International Symposium on Embedded Multicore/Many-core Systems-on-Chip, Sep. 2015, pp. 251-258.

(Continued)

*Primary Examiner* — Alex Skripnikov
*Assistant Examiner* — Pamit Kaur
(74) *Attorney, Agent, or Firm* — Kowert, Hood, Munyon, Rankin & Goetzel, P.C.; Rory D. Rankin

(57) ABSTRACT

Systems, apparatuses, and methods for dynamically selecting between wired and wireless interconnects for sending packets are disclosed. A system includes at least a hybrid communication engine and a plurality of interconnects for connecting to various end-points. The communication engine dynamically discovers and utilizes the best interconnect technology available in between given end-points. The communication engine dynamically chooses the physical interconnect that is best suited at any given time to send data from one source to one or multiple destinations. This communication can be either on-chip or across nodes. The communication engine makes a decision based on a set of predetermined parameters that can be re-adjusted by the application layer, such as latency of the transmission, message data size, physical distance from source to destination, the energy cost, and the current congestion on the alternative interconnects.

20 Claims, 8 Drawing Sheets

(51) Int. Cl.
H04W 40/10 (2009.01)
H04W 72/30 (2023.01)

(56) References Cited

U.S. PATENT DOCUMENTS

| | | | | |
|---|---|---|---|---|
| 2008/0133646 | A1* | 6/2008 | Azulai | G06F 9/541 709/202 |
| 2010/0040079 | A1* | 2/2010 | Park | H04L 12/1881 370/432 |
| 2012/0203796 | A1* | 8/2012 | Abraham | H04W 4/02 707/770 |
| 2012/0320919 | A1* | 12/2012 | Baliga | H04L 45/125 370/392 |
| 2013/0136117 | A1* | 5/2013 | Schrum, Jr. | H04B 3/54 370/338 |
| 2013/0322418 | A1* | 12/2013 | Ho | H04W 48/20 370/338 |
| 2015/0382274 | A1* | 12/2015 | Logvinov | H04L 41/0833 370/311 |
| 2016/0226742 | A1* | 8/2016 | Apathotharanan | H04L 43/106 |
| 2020/0163003 | A1* | 5/2020 | Shahar | H04L 69/18 |
| 2020/0412666 | A1* | 12/2020 | Papadantonakis | H04L 49/103 |

OTHER PUBLICATIONS

Fernando et al., "Replica: A Wireless Manycore for Communication-Intensive and Approximate Data", 2019 Architectural Support for Programming Languages and Operating Systems (ASPLOS '19), 15 pages, Apr. 13-17, 2019, Providence, RI, USA.

Yin et al., "Hybrid Wired/Wireless On-Chip Network Design for Application-Specific SoC", IEICE Transactions on Electronics, Apr. 2012, pp. 495-505, vol. E95-C, No. 4.

Keeton et al., "Persistent memory: new tier or storage replacement?", SNIA Storage Developer Conference, Sep. 2017, 43 pages, https://www.snia.org/sites/default/files/SDC/2017/presentations/General_Session/Keeton_Kimberly_Spence_Susan_Persistent_Memory_New_Tier_or_Storage_Replacement.pdf.

\* cited by examiner

Interconnect Selection Table 410

| Sufficient Energy Budget? | Multicast? | Latency Sensitive Packet? | Preferred Interconnect |
|---|---|---|---|
| 0 | 0 | 0 | b'00 |
| 0 | 0 | 1 | b'10 |
| 0 | 1 | 0 | b'00 |
| 0 | 1 | 1 | b'10 |
| 1 | 0 | 0 | b'00 |
| 1 | 0 | 1 | b'01 |
| 1 | 1 | 0 | b'01 |
| 1 | 1 | 1 | b'01 |

Interconnect Encodings Table 420

| Wired Interconnect | b'00 |
|---|---|
| Wireless Interconnect | b'01 |
| Optical Interconnect | b'10 |

FIG. 4

COMMUNICATION ENGINE FOR HYBRID INTERCONNECT TECHNOLOGIES

This invention was made with Government support under the PathForward Project with Lawrence Livermore National Security, Prime Contract No. DE-AC52-07NA27344, Subcontract No. B620717 awarded by the United States Department of Energy. The United States Government has certain rights in this invention.

BACKGROUND

Description of the Related Art

Industry solutions for interconnects are becoming increasingly heterogeneous in both protocol support and underlying technology. Advances in high-performance computing solutions lead to the ever-increasing problem of latency and energy consumption of data transmissions with longer distances and larger chip sizes. Sending data between compute modules and memory devices can consume large amounts of power and experience high latency depending on which interconnect is used. Accordingly, improved techniques for routing data between devices are desired.

BRIEF DESCRIPTION OF THE DRAWINGS

The advantages of the methods and mechanisms described herein may be better understood by referring to the following description in conjunction with the accompanying drawings, in which:

FIG. 4 illustrates an interconnect selection table and an interconnect encodings table in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for dynamically selecting between wired and wireless interconnects for sending packets are disclosed herein. In one implementation, a system includes at least a hybrid communication engine (HCE) and a plurality of interconnects for connecting to various end-points. As described, the HCE is hybrid in the sense that it communicates via both physical or wireless paths depending on various conditions. The HCE dynamically discovers and utilizes the best interconnect technology available in between given end-points. The HCE is capable of dynamically choosing the physical interconnect that is best suited at any given time for sending data from one source to one or multiple destinations. The data can be sent either on-chip or across nodes. The HCE makes a decision based on both static and dynamic information. The static information includes a set of predetermined parameters that can be re-adjusted by the application layer, such as latency of the transmission, message data size, physical distance from source to destination, and the energy cost. The dynamic information includes the current congestion on the interconnects.

Figure 1:
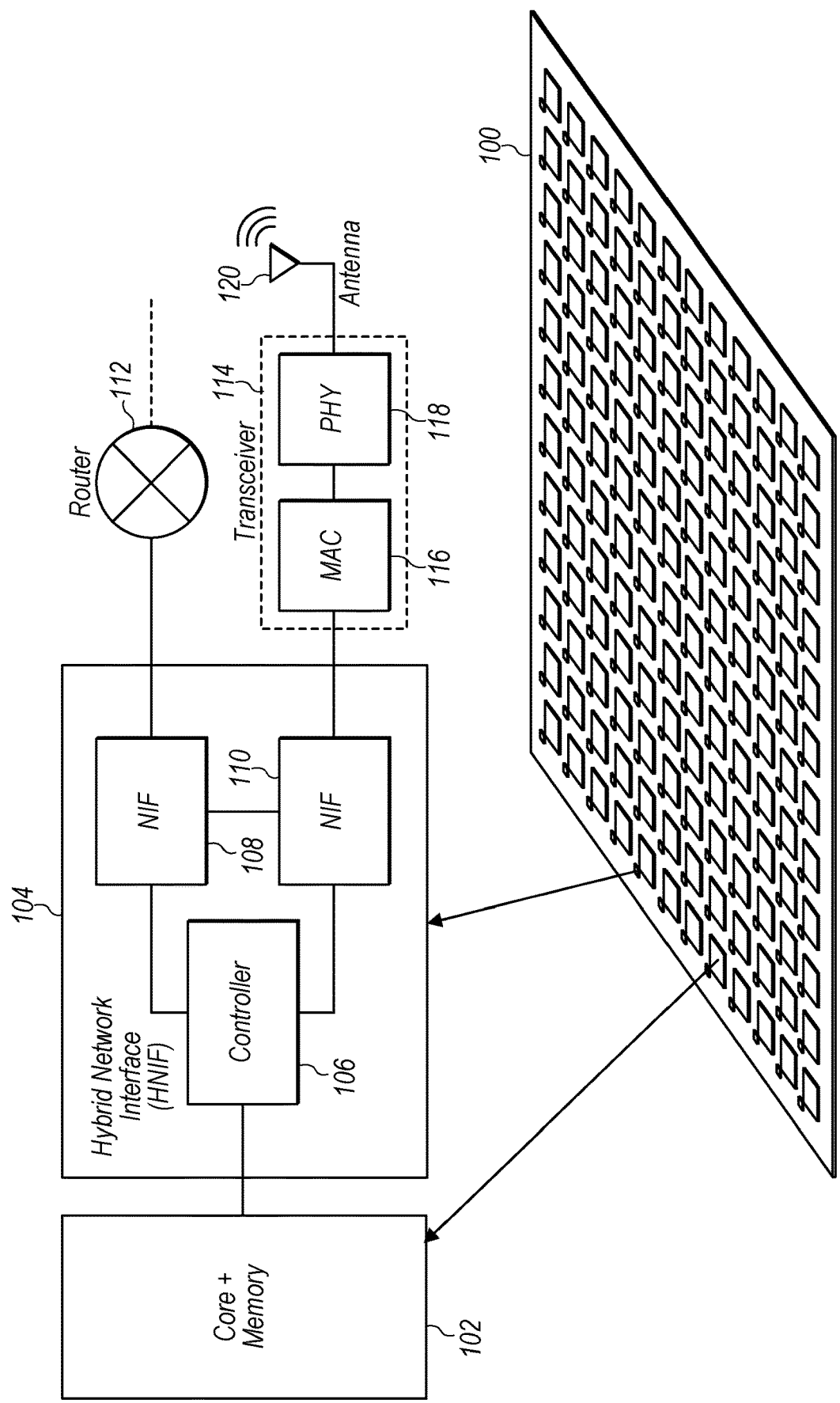
FIG. 1 is a block diagram of one implementation of a system on chip (SoC).

Referring now to FIG. 1, a block diagram of one implementation of a system on chip (SoC) 100 with a chiplet-based design is shown. In one implementation, SoC 100 includes a plurality of compute modules coupled to a plurality of network interface modules. An example compute module 102 is shown next to an expanded hybrid network interface (HNIF) module 104 above SoC 100. The compute module 102 includes at least one or more processor cores and one or more memory devices. The type of memory in the memory device(s) can include Dynamic Random Access Memory (DRAM), Static Random Access Memory (SRAM), NAND Flash memory, NOR flash memory, Ferroelectric Random Access Memory (FeRAM), or others. HNIF module 104 includes a controller 106 coupled to a wired network interface (NIF) module 108 and a wireless NIF module 110. In other implementations, controller 106 can be coupled to other numbers and/or types of NIF modules. Controller 106 is implemented using any suitable combination of hardware and/or software.

In one implementation, NIF module 108 is coupled to router 112 for sending packets over a wired interface while NIF module 110 is coupled to transceiver 114 for sending packets wirelessly via antenna 120. In one implementation, transceiver 114 includes medium access control (MAC) module 116 and physical layer (PHY) module 118. For each packet generated by compute module 102 and sent to HNIF module 104, HNIF module 104 makes a decision on which interconnect to send the packet. While two separate interconnects (wired and wireless) are shown for HNIF module 104, in other implementations, a HNIF module can be connected to three or more different interconnects. It is noted that SoC 100 includes any number of these compute modules 102 and HNIF modules 104, with the number of each varying according to the implementation.

In various implementations, SoC 100 can be part of a server, computer, laptop, mobile device, game console, node, streaming device, wearable device, or any of various other types of computing systems or devices. It is noted that the number of components of SoC 100 can vary from implementation to implementation. There can be more or fewer of each component than the number shown in FIG. 1. It is also noted that SoC 100 can include other components not shown in FIG. 1. Additionally, in other implementations, SoC 100 can be structured in other ways than shown in FIG. 1.

Figure 2:
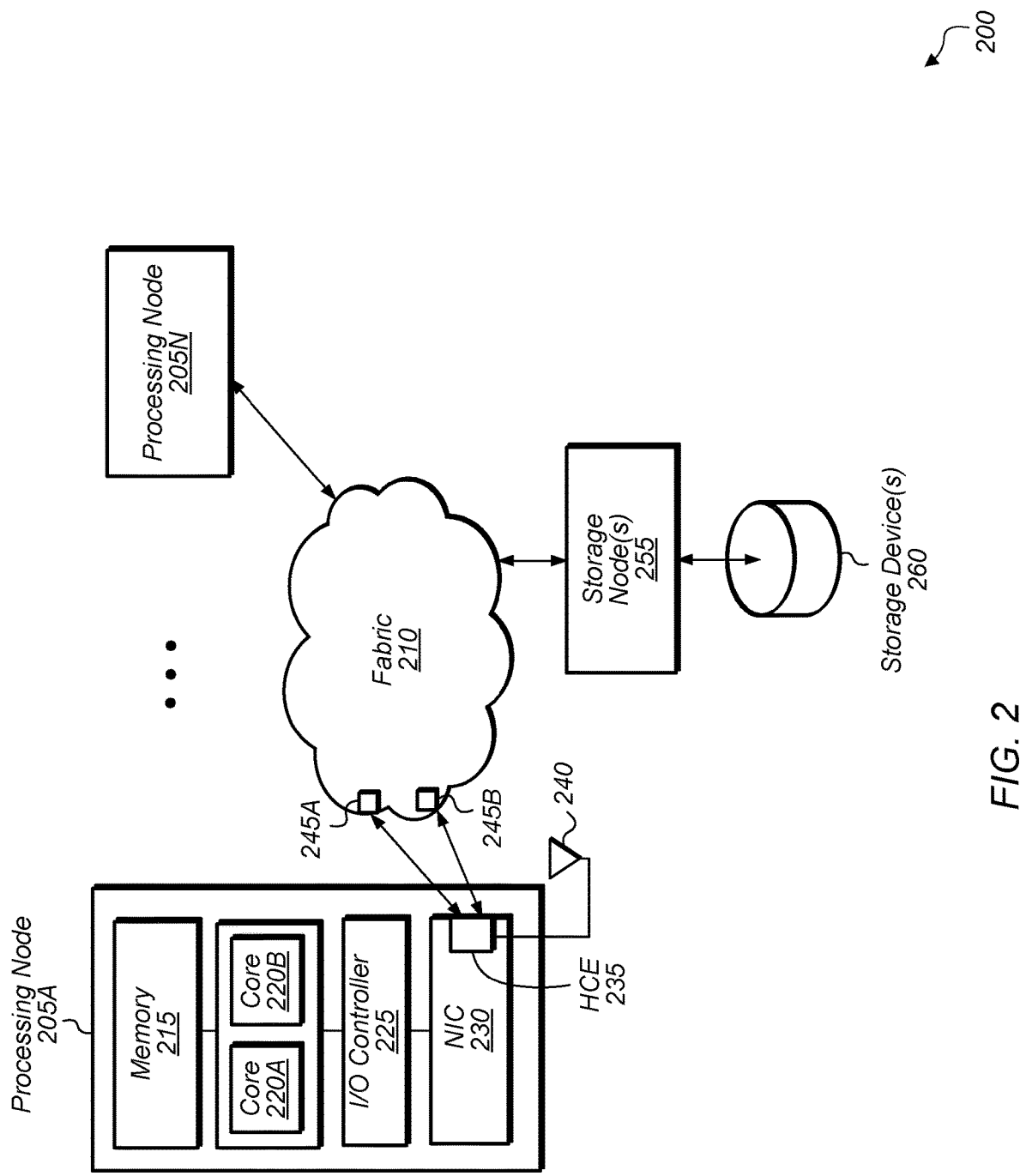
FIG. 2 is a block diagram of one implementation of a multi-node processing system.

Turning now to FIG. 2, a block diagram of one implementation of a multi-node processing system 200 is shown. In one implementation, multi-node processing system 200 includes processing nodes 205A-N, fabric 210, storage node(s) 255, and storage device(s) 260. In other implementations, multi-node processing system 200 can include other components in other configurations. It is noted that multi-node processing system 200 can also be referred to as server 200. Processing nodes 205A-N execute various software programs, including operating systems (OSs), hypervisors, virtualization software, compute applications, and the like. Processing nodes 205A-N are representative of any number and type (e.g., server blades) of computing systems or devices that are coupled together via fabric 210. Some of processing nodes 205A-N include wireless interconnects to communicate with other nodes wirelessly.

As shown, processing node 205A includes memory 215, processor cores 220A-B, an input/output (I/O) controller 225, and a network interface controller (NIC) 230 with hybrid communication engine (HCE) 235. While HCE 235 is shown to be part of the NIC 230, functionality associated with the HCE 235 may be located elsewhere within the system. Processing node 205A can also include other components (e.g., peripheral components) to support the operation of the processing node. The other processing nodes can also include equivalent or similar components. Processor cores 220A-B are representative of a variety of types of processor cores and combinations thereof, such as a central processing unit (CPU) core, a graphics processing unit (GPU) core, a digital signal processor (DSP), and the like. Memory 215 includes system random access memory (RAM), flash memory, cache, register files, disc storage, and the like. Memory 215 stores software (e.g., executable instructions) to manipulate the processing node 205A to perform desired operations and implement specific functionality.

The fabric 210 includes any of a variety of switching fabric architectures to provide a mesh of point-to-point links between the processing nodes 205A-N of the system 200. The interconnects of fabric 210 include links implemented in accordance with one or more of a Peripheral Component Interconnect-Express (PCIE) standard, a Rapid IO standard, a Rocket IO standard, a Hyper-Transport standard, a Fiber-Channel standard, and the like. In some implementations, such as a network aggregation of processing resources, fabric 210 can include one or more Layer 2 or Layer 3 switches or routers implementing one or more of a media access control (MAC) protocol, an Ethernet protocol, such as a Gigabit Ethernet (GbE) Attachment Unit Interface (XAUI) standard protocol, a Telecommunications Protocol/Internet Protocol (TCP/IP), or other protocols. Alternatively, the fabric 210 can be implemented in accordance with a proprietary switching fabric architecture, or with a combination of switching fabric architectures, such as a combination of Ethernet and Infiniband architectures.

In one implementation, fabric 210 includes multiple ports (e.g., 245A and 245B) for HCE 235 of NIC 230 for receiving and sending packets from and to processing node 205A. As used herein, the term "packet" is defined as any type of message or collection of data being sent or received. A "packet" is intended to refer broadly to any of a variety of datagram formats, including a packet (e.g., an IP packet), a frame (e.g., an Ethernet frame), and the like. HCE 235 is also coupled to a wireless interface 240 for sending and receiving packets. HCE 235 determines on which interconnect to send a given packet based on the parameters associated with the given packet and based on the current status of the plurality of available interconnects.

Figure 3:
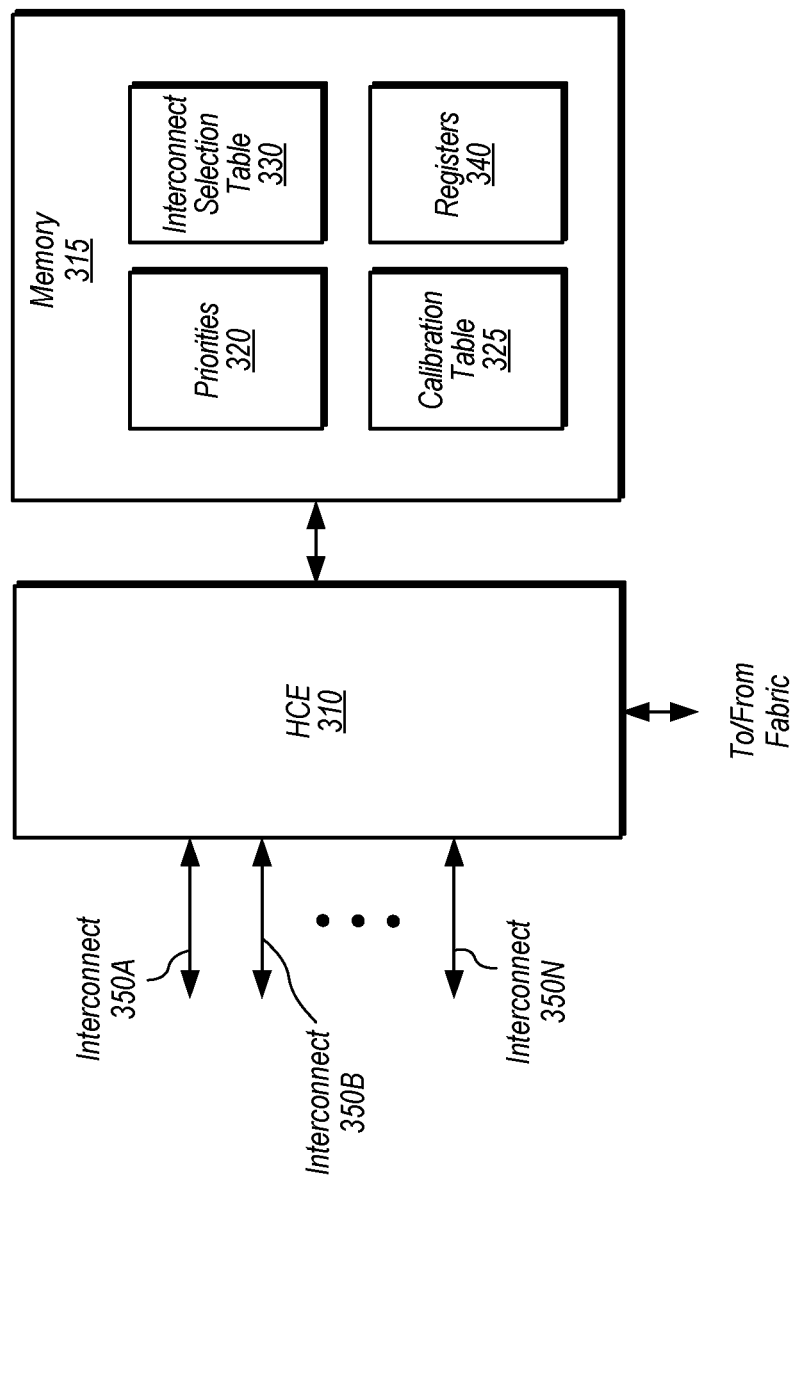
FIG. 3 is a block diagram of one implementation of a portion of a SoC.

Referring now to FIG. 3, a block diagram of one implementation of a portion of a SoC 300 is shown. In one implementation, SoC 300 includes at least a hybrid communication engine (310) coupled to memory 315. The HCE 310 is also coupled to a plurality of interconnects 350A-N and a fabric (not shown) and any number of other components via the fabric. HCE 310 is implemented using any suitable combination of hardware (e.g., control logic, logic gates, processing unit, processing elements) and/or software (e.g., program instructions). In one implementation, memory 315 stores priorities 320, calibration table 325, interconnect selection table 330, and registers 340. Memory 315 can also store other types of data and/or program instructions.

In one implementation, each process executed by the processor core(s) (not shown) of SoC 300 has a priority level, and these priority levels are represented by priorities 320 in memory 315. It should be understood that the various priorities 320 for the different processes can be stored in different locations even though they are shown as a monolithic block in memory 315. Each packet received by HCE 310 has an implicit priority level that the packet inherits from its process. In other embodiments, the packet may itself include an explicit indication of a priority. In either case, a priority is associated with the packet. For example, in one implementation, each packet has a process ID that is sent with the packet. In one implementation, HCE 310 retrieves the priority level from priorities 320 for a given process ID when HCE 310 receives a packet with the given process ID. Alternatively, the HCE 310 identifies a priority included within the packet. Then, HCE 310 uses the priority level, along with other information, to determine on which interconnect 350A-N to route the packet. It is noted that a "packet" can also be referred to herein as a "message" or as a "network packet". In one implementation, the operating system (OS) of SoC 300 stores priorities 320 in memory 315 for the different processes executing on SoC 300.

Along with the priority of the process that sent the packet, other attributes of the packet are also used to determine on which interconnect 350A-N to route the packet. These other attributes include the number of end-points targeted by the packet. For example, HCE 310 determines if the packet is a multicast, broadcast, or unicast packet. Also, HCE 310 also uses the current status of interconnects 350A-N to determine on which interconnect to route the packet. For example, if a given interconnect is congested, then HCE 310 will not use the given interconnect. Rather, HCE 310 will attempt to use a non-congested interconnect when possible. In one implementation, HCE 310 determines the current status of interconnects 350A-N by performing a periodic calibration phase to calibrate each of the interconnects 350A-N. The results of the calibration phase are stored in calibration table 325.

In one implementation, HCE 310 dynamically discovers the topology of the interconnects 350A-N during run-time. In one implementation, during the topology detection phase, HCE 310 first tries to detect what other HCEs on distant end-points are reachable from HCE 310 using networking discovery functions to detect other end-points. In one implementation, HCE 310 sends broadcasting discovery packets meant for other HCEs. Once a HCE receives such a discovery packet, the HCE replies with its unique ID and specifies the channel technology from which it received the discovery packet. After discovering the topology, HCE 310 determines the capabilities of the interconnects, the latency that packets will experience on each interconnect, the bandwidth each interconnect can sustain, and whether each interconnect is congested.

In one implementation, HCE 310 follows a set of rules to determine which interconnect to use based on the packet parameters. In one implementation, these set of rules are encoded in the entries in interconnect selection table 330. One example of an interconnect lookup table 410 is described in more detail in the discussion associated with FIG. 4. After following the set of rules to determine which interconnect to use based on the packet parameters, HCE 310 checks the status of the interconnects from the data stored in calibration table 325. For example, HCE 310 might decide to use a first interconnect based on the packet parameters, but if the first interconnect is currently congested, HCE 310 will choose to use a second interconnect. Also, in some cases, the given interconnect chosen by HCE 310 can be overruled by the software on a packet-by-packet basis.

In one implementation, configuration registers 340 specify how HCE 310 performs a lookup into table 330 for a given packet. In one implementation, an application executing on SoC 300 reprograms HCE 310 by writing into a set of configuration registers 340 that the OS exposes to the application at a particular address in memory 315. The firmware can map registers 340 so that certain applications can write and read from these registers 340. If the OS gives permissions to the application to change registers 340, then the application can reprogram the registers 340. This allows each application to customize the selection criteria used by HCE 310 for determining which interconnects 350A-N to use for the packets generated by the application.

Turning now to FIG. 4, an interconnect selection table 410 and an interconnect encodings table 420 in accordance with one implementation are shown. In one implementation, an HCE (e.g., HCE 310 of FIG. 3) uses interconnect selection table 410 to determine on which interconnect to route an incoming packet. For example, the HCE determines if there is sufficient energy budget available (yes=1, no=0), if the packet is a multicast packet (yes=1, no=0), and if the packet is a latency-sensitive packet (yes=1, no=0). Based on these determinations, the HCE generates a three-bit value to use for performing a lookup to table 410. The value retrieved from the matching entry indicates which interconnect is the preferred interconnect for routing the packet. Table 420 lists the mapping of bit value from the preferred interconnect field of table 410 to the actual interconnect. For example, in one implementation, a wired interconnect is encoded as "00", a wireless interconnect is encoded as "01", and an optical interconnect is encoded as "10". Other implementations can include other interconnects and/or other types of encodings. Once the HCE retrieves the preferred interconnect value from the matching entry, the HCE checks the status of the preferred interconnect from a corresponding calibration table (e.g., calibration table 325 of FIG. 3). If the status of the preferred interconnect does not interfere with the latency requirements and/or other requirements of the given packet, then the HCE routes the given packet on the preferred interconnect.

In one implementation, a packet includes information in a header or other field specifying whether the packet is unicast, multicast, or broadcast. If the packet is multicast or broadcast, then the "multicast" field will be set to "1". In one implementation, software allocates an energy budget to the HCE. In this implementation, software sends an energy budget value to the HCE on a regular basis once every given interval. The HCE tracks how much energy has been used by the packets traversing the HCE and determines if the energy budget has been exceeded. This determination can be made on a packet-by-packet basis as packets are received and forwarded.

In one implementation, the HCE uses the priority of the process which generated the packet (or a priority otherwise associated with the packet) for generating a measure of the latency-sensitivity of the packet. In this implementation, if the priority of the process meets a threshold (e.g., is equal to and/or greater than the threshold), then the HCE considers the packet to be latency-sensitive. Otherwise, if the priority of the process is less than or equal to the threshold, then the HCE considers the packet to not be latency-sensitive. In one implementation, the OS sends the priority of the process to the HCE. In another implementation, the HCE retrieves the priority of the process from a location in memory. In another implementation, the HCE uses the type of application that generated a packet for determining whether the packet is latency-sensitive. For example, in this implementation, the type of application (or the thread) and corresponding priority can be used as a proxy for the packet priority. In other implementations, the HCE can use other suitable techniques for determining whether a packet is latency-sensitive.

In one implementation, table 410 is generated in part by software and in part by the HCE after a topology discovery phase has been performed and the various available interconnects have been detected. The HCE also periodically performs the calibration phase to determine the current state of the interconnects. From time to time, one or more of the interconnects could be suffering from congestion, and this can affect which interconnect is chosen for latency-sensitive packets. For example, if the optical interconnect is suffering from traffic-related congestion, then the wired interconnect can be chosen for latency-sensitive packets if there is not sufficient energy-budget available for sending the packet on the wireless interconnect. In one implementation, if the HCE does not have enough energy in the energy budget, then the HCE does not choose the wireless interconnect for sending packets since the wireless interconnect uses more energy than the wired and optical interconnects. However, in this implementation, if there is sufficient energy in the energy budget, and if the packet is latency-sensitive or a multicast packet, then the packet is sent on the wireless interconnect.

It is noted that the particular entries in table 410 and the interconnect encodings in table 420 are merely indicative of one implementation. The preferred interconnect can differ in other implementations and at different points in time as the congestion that exists on one or more interconnects fluctuates. Also, in another implementation, rather than using table 410, the HCE includes control logic to perform similar functionality. In other implementations, other mechanisms for selecting a preferred interconnect are possible and are contemplated.

Figure 5:
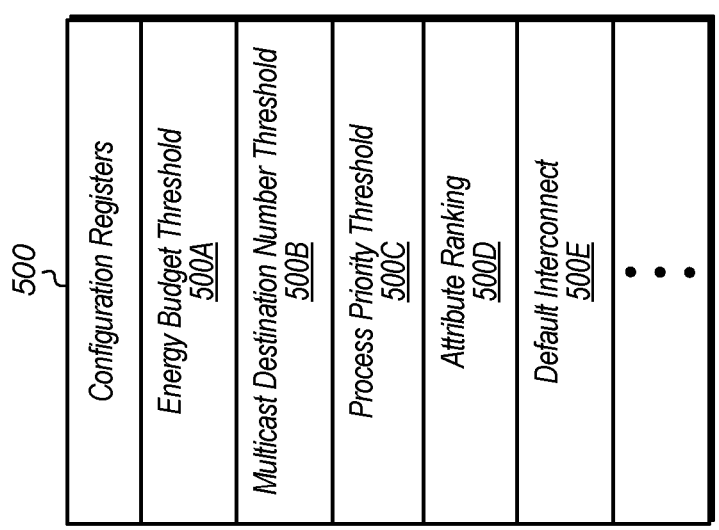
FIG. 5 illustrates a set of configuration registers for use by a hybrid communication engine in accordance with one implementation.

Referring now to FIG. 5, a set of configuration registers 500 for use by a HCE in accordance with one implementation are shown. Configuration registers 500 are used to configure a HCE (e.g., HCE 310 of FIG. 3) to control the selection of an interconnect for forwarding a received packet. In one implementation, configuration registers 500 are programmed by the operating system (OS). In some cases, the OS exposes configuration registers 500 to application software by giving application software read and write permissions. For example, in one implementation, each application programs configuration registers 500 with its own set of values to cause the HCE to adopt a certain type of behavior during execution of the application.

In one implementation, configuration registers 500 include an energy budget threshold register 500A, multicast destination number threshold 500B, process priority threshold 500C, attribute ranking 500D, default interconnect 500E, and any number of additional registers. In other implementations, configuration registers 500 can include other numbers and/or types of registers. In one implementation, the energy budget threshold 500A specifies at what point of the utilized energy budget not to send packets over the wireless interconnect. For example, if the energy budget threshold 500A is 80%, then once 80% of the energy budget has been used by the HCE for a given interval, then packets will no longer be sent on the wireless interconnect. In another implementation, the HCE can be allocated a certain budget by the hardware, but the application can set the energy budget threshold 500A to artificially reduce the energy budget of the HCE. In this implementation, the application causes the HCE to operate in a more constrained, challenging energy environment to reduce power consumption when choosing which interconnect for forwarding each packet. For example, in this implementation, if the energy budget threshold 500A is 70%, then the energy budget of the HCE is reduced by 30%. This allows the application to artificially diminish the energy budget allocated to the HCE.

The multicast destination number threshold register 500B specifies a number of endpoints that a packet should target for the packet to be routed on the wireless interconnect. In other words, multicast destination number threshold register 500B defines whether a packet is considered a multicast or unicast packet for the purposes of routing on the wireless interconnect. If the packet does not meet the threshold, then the packet will not be sent on the wireless interconnect. This ensures that the wireless interconnect is only used if there are a sufficiently high number of recipients for the multicast packet.

The process priority threshold register 500C specifies the priority threshold for packets to be considered latency-sensitive. If the priority of a given process is greater than the threshold stored in process priority threshold register 500C, then the packets of the given process will be sent over a low-latency interconnect if no other attributes conflict with this selection. The attribute ranking register 500D includes a relative ranking of the different attributes of the packet to specify which attribute should be given greater weight in making the interconnect selection. Depending on a current state of the system, the rankings indicated by the ranking register 500D are changed. For example, if a low power mode is indicated, then an energy budget may have its ranking increased. Alternatively, if a high performance mode is indicated, then a latency rank may have its rank increased, and so on. If the energy budget is ranked highest, then packets will be routed on the interconnect that uses the least amount of energy. If latency is ranked highest, then packets will be routed on the lowest-latency interconnect. If the type of packet (e.g., unicast vs multicast) has the highest ranking, then the unicast or multicast character of the packet will dictate which interconnect is chosen. The attribute ranking register 500D is also able to indicate that there is no preferred attribute and that other selection criteria should be used when a default value is stored in register 500D.

The default interconnect register 500E specifies the interconnect that the application would like the HCE to default to for sending packets when other attributes do not provide a clear preference for one interconnect over the others. In one implementation, the default interconnect register 500E is selected when the attributes of the packet tend to cancel each other out. For example, if a packet is latency-sensitive but a unicast packet, then the latency-sensitive attribute would favor the wireless interconnect while the unicast attribute would favor a wired interconnect. In this case, the HCE could opt for the default interconnect specified by default interconnect register 500E. Other cases could also result in the HCE choosing the default interconnect if there is not a clear preference of one interconnect over the other interconnects based on the attributes of the packet. In one implementation, each application is able to program configuration registers 500 to customize the way the HCE processes the packets generated by the application.

Figure 6:
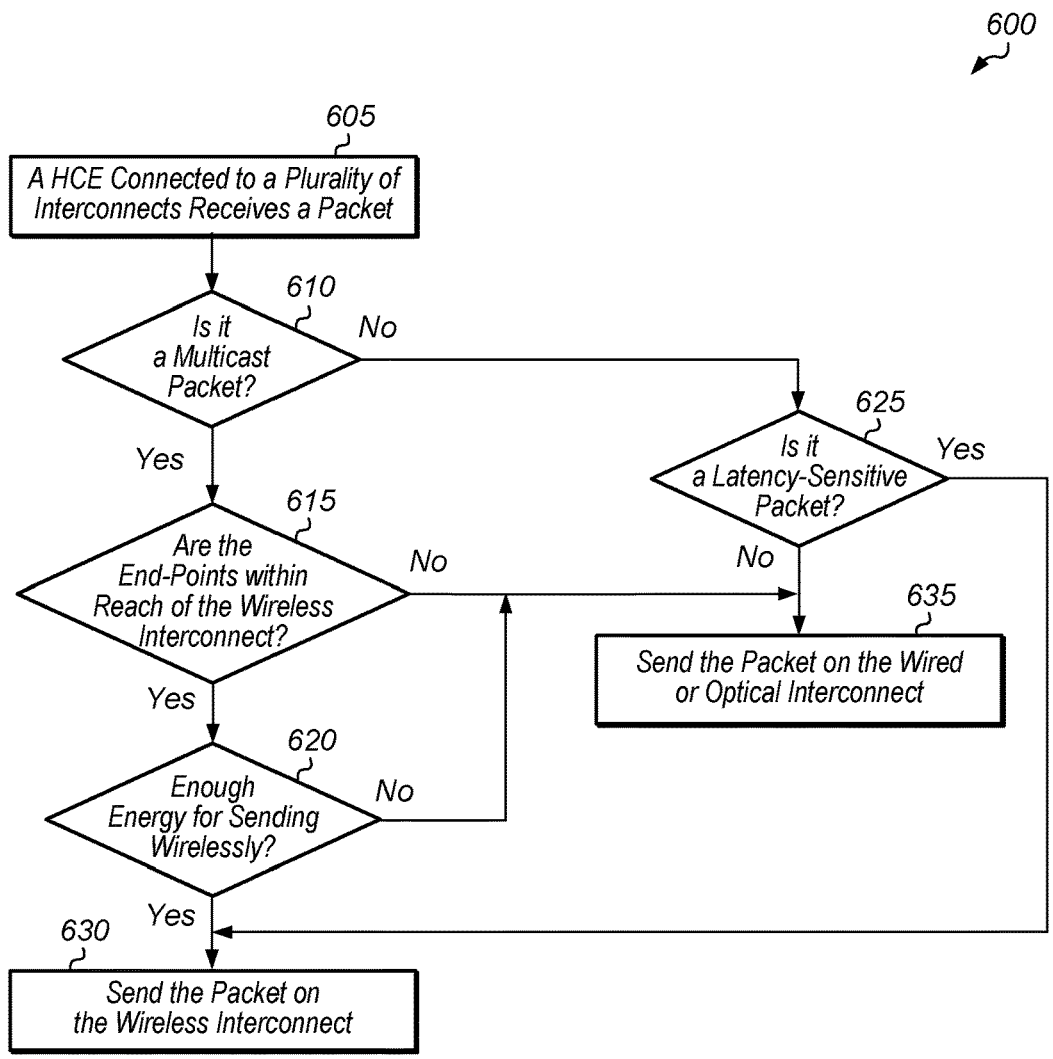
FIG. 6 is a generalized flow diagram illustrating one implementation of a method for determining on which interconnect to route a packet.
Figure 7:
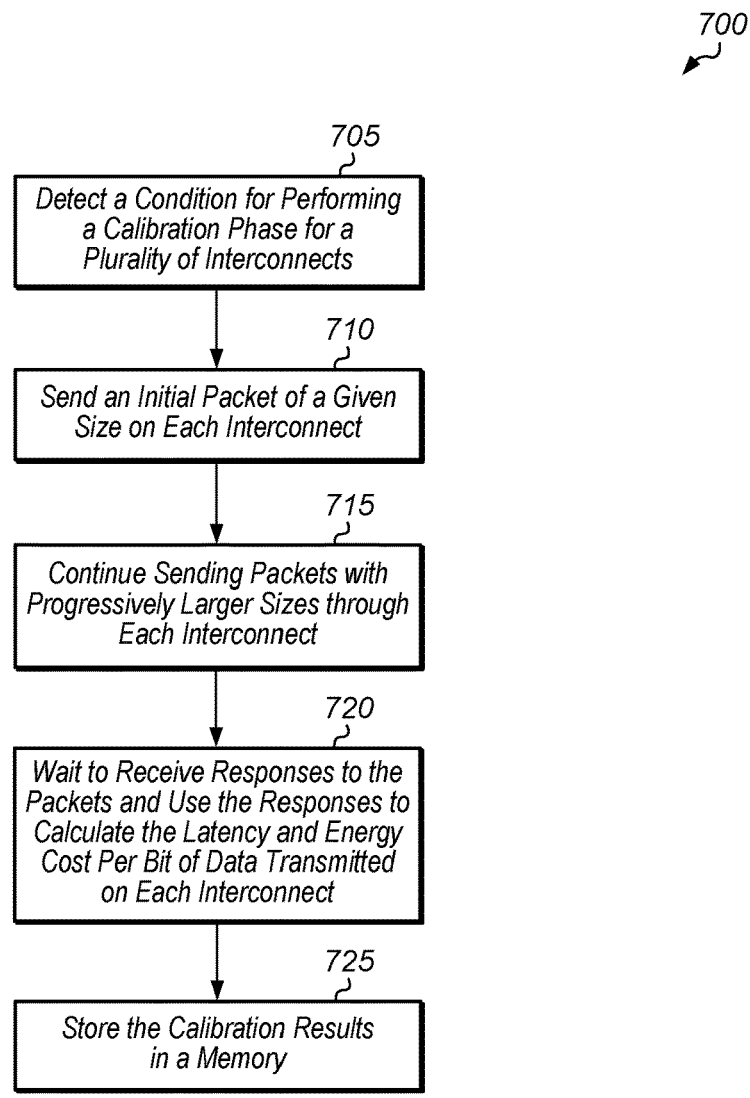
FIG. 7 is a generalized flow diagram illustrating one implementation of a method for a HCE calibrating a plurality of interconnects.
Figure 8:
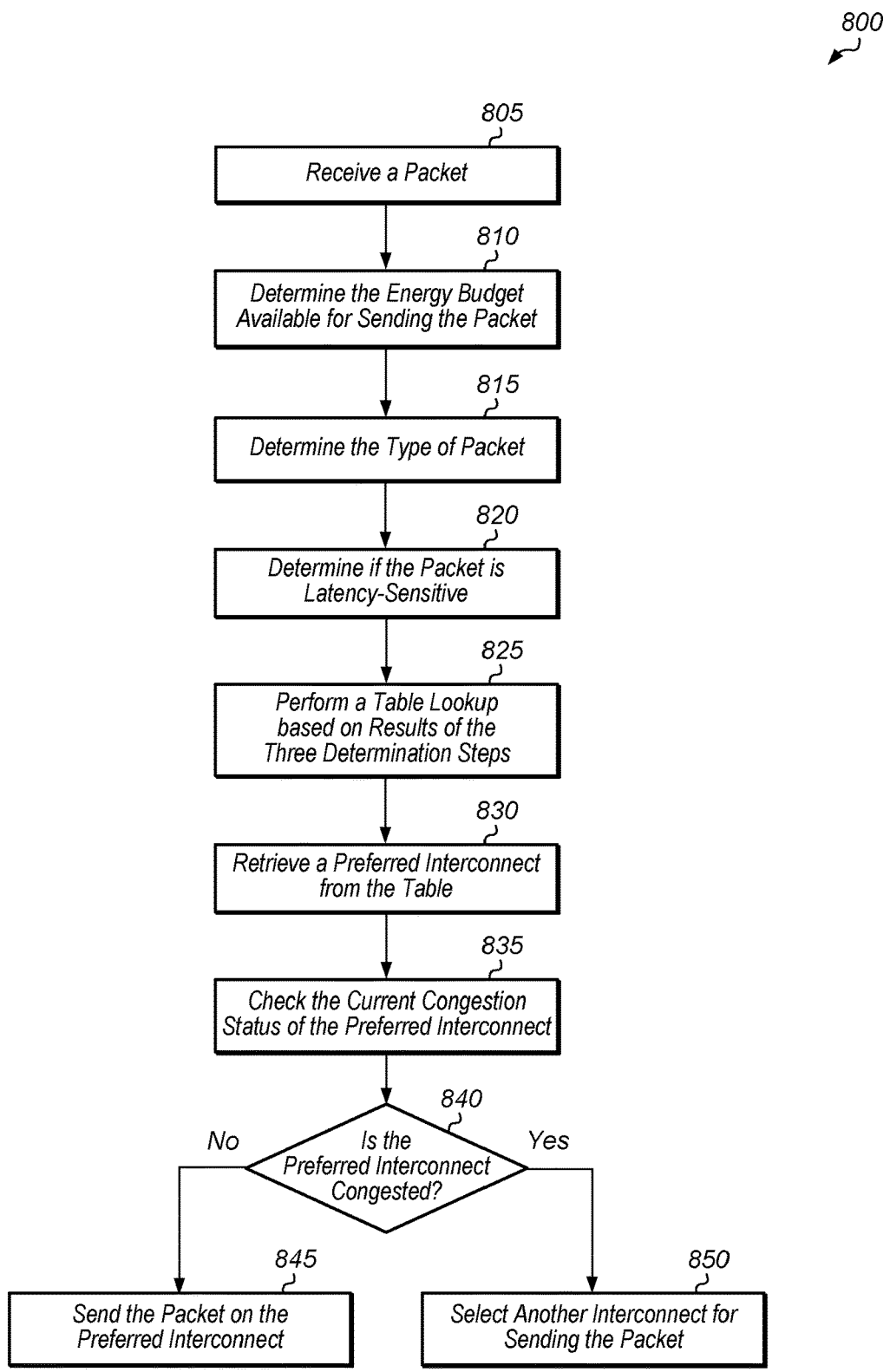
FIG. 8 is a generalized flow diagram illustrating one implementation of a method for determining a preferred interconnect for sending a packet.

Turning now to FIG. 6, one implementation of a method 600 for determining on which interconnect to route a packet is shown. For purposes of discussion, the steps in this implementation and those of FIGS. 7-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein implement method 600.

A HCE connected to a plurality of interconnects receives a packet (block 605). It is assumed for the purposes of this discussion that the plurality of interconnects include a wireless interconnect. If the packet is a multicast packet (conditional block 610, "yes" leg), then the HCE determines if the end-points targeted by the packet are within reach of the wireless interconnect (conditional block 615). In one implementation, the packet is considered a multicast packet if the packet is either a multicast or broadcast packet. In other implementations, the HCE applies a threshold in conditional block 610 based on the number of recipients targeted by the packet.

If the end-points targeted by the packet are within reach of the wireless interconnect (conditional block 615, "yes" leg), then the HCE determines if its allocated energy budget has enough margin for sending the packet on the wireless interconnect (conditional block 620). In one implementation, the HCE determines, based on the calibration data, how much energy is required to send the packet on the wireless interconnect, and then the HCE determines if there is enough margin for the energy required to send the packet on the wireless interconnect.

If the HCE's allocated energy budget has enough margin for sending the packet on the wireless interconnect (conditional block 620, "yes" leg), then the HCE sends the packet on the wireless interconnect (block 630). Otherwise, if the HCE's allocated energy budget does not have enough margin for sending the packet on the wireless interconnect (conditional block 620, "no" leg), then the HCE sends the packet on a wired or optical interconnect (block 635). In other implementations, when the HCE has other available interconnects, the HCE can send the packet on one of these other interconnects. It is noted that the HCE can make a determination for choosing between the wired and optical interconnect based on whichever interconnect will use less energy for carrying the packet. Alternatively, the HCE can use the expected latency to differentiate between the wired and optical interconnect. The energy and latency data is obtained from calibration data in one implementation. After blocks 630 and 635, method 600 ends.

If the packet is not a multicast packet (conditional block 610, "no" leg), then the HCE determines if the packet is a latency-sensitive packet (conditional block 625). In one implementation, the HCE uses the priority of the process that generated the packet as a proxy for the latency sensitivity of the packet. For example, in one implementation, if the priority of the process that generated the packet is greater than a threshold, then the packet is considered a latency-sensitive packet. In other implementations, other ways of determining whether the packet is a latency-sensitive packet can be used. If the packet is a latency-sensitive packet (conditional block 625, "yes" leg), then the HCE sends the packet on the wireless interconnect (block 630). Otherwise, if the packet is not a latency-sensitive packet (conditional block 625, "no" leg), then the HCE sends the packet on the wired or optical interconnect (block 635). If the end-points targeted by the packet are not within reach of the wireless interconnect (conditional block 615, "no" leg), then the HCE sends the packet on the wired or optical interconnect (block 635).

Referring now to FIG. 7, one implementation of a method 700 for a HCE calibrating a plurality of interconnects is shown. A HCE detects a condition for performing a calibration phase for a plurality of interconnects (block 705). In one implementation, the condition is system start-up. In another implementation, the condition is an indication that a new interconnect has been enabled for the system. In other implementations, other conditions can trigger the calibration phase.

Next, the HCE sends an initial packet of a given size on each interconnect (block 710). Then, the HCE continues sending packets with progressively larger sizes through each interconnect (block 715). Next, the HCE waits to receive responses to the packets and uses the responses to determine one or more of the latency and energy cost per bit of data transmitted on each interconnect, and throughput of the communication interconnect (block 720). In various embodiments, a maximum throughput of each interconnect is determined (e.g., based on the type of communication medium, etc.). Then, the HCE stores the calibration results in a memory (block 725). The memory can be a local, internal memory of the HCE or a memory coupled to the HCE. After block 725, method 700 ends. It is noted that the results of the calibration can be used later when determining on which interconnect to send a received packet during normal operations.

Turning now to FIG. 8, one implementation of a method 800 for determining a preferred interconnect for sending a packet is shown. A HCE receives a packet (block 805). Next, the HCE determines the energy budget available for sending the packet (block 810). Also, the HCE determines the type of packet (e.g., multicast, unicast) (block 815). Additionally, the HCE determines if the packet is latency-sensitive (block 820). Any of the previous discussed techniques for determining whether the packet is latency-sensitive can be used. Then, the HCE performs a lookup to a table based on results of the three determination steps (block 825). One example of a table 410 used by a HCE is shown in FIG. 4. In other implementations, the lookup can be performed based on other numbers of determination steps.

Next, the HCE retrieves a preferred interconnect from the table (block 830). Then, the HCE checks the current congestion status of the preferred interconnect (block 835). In one implementation, the congestion status is determined based on the calibration results generated during a calibration phase. If the preferred interconnect is not currently congested (conditional block 840, "no" leg), then the HCE sends the packet on the preferred interconnect (block 845). Otherwise, if the preferred interconnect is congested (conditional block 840, "yes" leg), then the HCE selects another interconnect for sending the packet (block 850). The HCE can use any of the previously described techniques for selecting another interconnect in block 850. After blocks 845 and 850, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (MIL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors that execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
an integrated circuit comprising:
   a processor core; and
   a communication engine comprising circuitry configured to:
      receive a packet generated by the processor core, wherein one or more destinations of the packet are reachable via at least two communication channels including a wireless communication channel and non-wireless communication channel, wherein the one or more destinations are part of the integrated circuit; and
      transmit the packet via a given channel of the two communication channels to a destination of the one or more destinations, wherein the given channel is selected based at least in part on:
         an energy budget associated with transmitting the packet via the given channel; and
         comparison of a number of destinations targeted by the packet with a threshold.

2. The system as recited in claim 1, wherein responsive to the number of destinations targeted by the packet exceeding the threshold, the communication engine is configured to select the wireless communication channel as the given channel.

3. The system as recited in claim 1, wherein the communication engine comprises circuitry configured to:
perform a topology detection phase comprising:
   broadcasting one or more discovery packets to a plurality of destinations in the integrated circuit;
   receiving one or more replies to the discovery packets, wherein each of the replies includes a unique identifier of a destination that received a given discovery packet and an identification of a channel technology via which the given discovery packet was received;
   generate data based at least in part on the replies.

4. The system as recited in claim 1, wherein the communication engine is configured to receive a communication from each of a one or more devices that includes an identification of a given device of the one or more devices, and a communication channel technology via which the given device received a communication from the communication engine, wherein the communication channel technology includes one or more of a wireless technology and a non-wireless technology.

5. The system as recited in claim 1, further comprising at least one configuration register comprising an indication of a ranking of a plurality of attributes associated with the packet for use in selecting the given channel, the plurality of attributes at least comprising the number of destinations targeted by the packet.

6. The system as recited in claim 1, wherein the communication engine is further configured to select the given channel in response to a determination that the packet is at least one of:
a multicast packet; and
a latency sensitive packet.

7. The system as recited in claim 1, wherein the communication engine is configured to determine a state of each interconnect of a plurality of interconnects, by determining one or more of: a latency associated with each interconnect, an amount of energy required to convey the packet via each interconnect, and a maximum throughput of each interconnect.

8. A method comprising:
receiving, by a communication engine circuit of an integrated circuit, a packet generated by a processor core of the integrated circuit, wherein one or more destinations of the packet are reachable via at least two communication channels including a wireless communication channel and non-wireless communication channel, wherein the one or more destinations are part of the integrated circuit; and
transmitting, by the communication engine circuit, the packet via a given channel of the two communication channels to a destination of the one or more destinations, wherein the given channel is selected based at least in part on:
an energy budget associated with transmitting the packet via the given channel; and
comparing a number of destinations targeted by the packet with a threshold.

9. The method as recited in claim 8, wherein responsive to the number of destinations targeted by the packet exceeding the threshold, the method further comprising selecting the wireless communication channel as the given channel.

10. The method as recited in claim 8, further comprising:
performing, by the communication engine circuit, a topology detection phase comprising:
broadcasting one or more discovery packets to a plurality of destinations in the integrated circuit;
receiving one or more replies to the discovery packets, wherein each of the replies includes a unique identifier of a destination that received a given discovery packet and an identification of a channel technology via which the given discovery packet was received;
generating data based at least in part on the replies.

11. The method as recited in claim 8, further comprising receiving a communication from each of a one or more devices that includes an identification of a given device of the one or more devices, and a channel technology via which the given device received a communication from the communication engine, wherein the channel technology includes one or more of a wireless technology and a non-wireless technology.

12. The method as recited in claim 8, further comprising determining, by the communication engine, that a wireless interconnect is a preferred interconnect for transmitting the packet, responsive to determining the energy budget is sufficient to transmit the packet via the wireless interconnect.

13. The method as recited in claim 8, further comprising selecting, by the communication engine, the given channel in response to determining that the packet is at least one of:
a multicast packet; and
a latency sensitive packet.

14. The method as recited in claim 8, further comprising determining, by the communication engine, a state of each interconnect of a plurality of interconnects and one or more of: a latency associated with each interconnect, an amount of energy required to convey the packet via each interconnect, and a maximum throughput of each interconnect.

15. An apparatus comprising:
a plurality of configuration registers of an integrated circuit; and
a communication engine circuit, of the integrated circuit, configured to:
receive a packet, wherein one or more destinations of the packet are reachable via at least two communication channels including a wireless communication channel and non-wireless communication channel, wherein the one or more destinations are in the integrated circuit; and
transmit the packet via a given channel of the two communication channels to a destination of the one or more destinations, wherein the given channel is selected based at least in part on:
a configuration register of the plurality of configuration registers storing an energy budget;
an energy budget associated with transmitting the packet via the given channel; and
comparison of a number of destinations targeted by the packet to a threshold.

16. The apparatus as recited in claim 15, wherein responsive to the number of destinations targeted by the packet exceeding the threshold, the communication engine is configured to select the wireless communication channel as the given channel.

17. The apparatus as recited in claim 15, further comprising an interconnect selection table comprising a plurality of entries, wherein one or more of the plurality of entries are configured to store an indication as to whether a sufficient amount of the energy budget has been determined to be available and a preferred interconnect via which the packet is to be transmitted.

18. The apparatus as recited in claim 15, wherein the communication engine is configured to receive a communication from each of a one or more devices that includes an identification of a given device of the one or more devices and, a channel technology via which the given device received a communication from the communication engine, wherein the channel technology includes one or more of a wireless technology and a non-wireless technology.

19. The apparatus as recited in claim 15, wherein the communication engine is further configured to determine that a wireless interconnect is a preferred interconnect for transmitting the packet responsive to determining the energy budget is sufficient to transmit the packet via the wireless interconnect.

20. The apparatus as recited in claim 15, wherein the communication engine is further configured to
perform a topology detection phase comprising:
broadcasting one or more discovery packets to a plurality of destinations in the integrated circuit;
receiving one or more replies to the discovery packets, wherein each of the replies includes a unique identifier of a destination that received a given discovery packet and an identification of a channel technology via which the given discovery packet was received;
generate data based at least in part on the replies.

* * * * *